(12) United States Patent
Chien et al.

(10) Patent No.: US 8,199,204 B2
(45) Date of Patent: Jun. 12, 2012

(54) METHOD AND RELATED DEVICE FOR RESTORING IMAGE FOR ELECTRONIC DEVICE

(75) Inventors: Yen-Lung Chien, Taipei (TW); Chih-Tsung Shen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 217 days.

(21) Appl. No.: 12/484,260

(22) Filed: Jun. 15, 2009

(65) Prior Publication Data

US 2010/0002086 A1 Jan. 7, 2010

(30) Foreign Application Priority Data

Jul. 1, 2008 (TW) ................................ 97124728 A

(51) Int. Cl.
*H04N 5/228* (2006.01)

(52) U.S. Cl. .................................... 348/208.2

(58) Field of Classification Search ................ 348/208.2
See application file for complete search history.

(56) References Cited

U.S. PATENT DOCUMENTS

| | | | |
|---|---|---|---|
| 5,365,303 A | 11/1994 | Yamasaki et al. | |
| 5,696,848 A | 12/1997 | Patti et al. | |
| 7,110,024 B1 | 9/2006 | Silverbrook et al. | |
| 7,430,366 B2 * | 9/2008 | Togawa | 396/53 |
| 7,430,367 B2 * | 9/2008 | Imada | 396/55 |
| 7,636,517 B2 * | 12/2009 | Klinghult | 396/53 |
| 2008/0100716 A1 * | 5/2008 | Fu et al. | 348/208.8 |
| 2008/0136924 A1 * | 6/2008 | Washisu | 348/208.2 |
| 2008/0151061 A1 | 6/2008 | Chen | |
| 2008/0309777 A1 * | 12/2008 | Aoyama | 348/222.1 |
| 2009/0174782 A1 * | 7/2009 | Kahn et al. | 348/208.2 |

FOREIGN PATENT DOCUMENTS

CN 1337654 A 2/2002

* cited by examiner

*Primary Examiner* — Lin Ye
*Assistant Examiner* — Amy Hsu
(74) *Attorney, Agent, or Firm* — CKC & Partners Co., Ltd.

(57) ABSTRACT

In order to restore blurred images more efficiently, the invention provides a method for restoring an image for an electronic device. The method for restoring the image includes steps as follows. An acceleration signal is generated when an image of a photographed object is received. The distance between the electronic device and the photographed object is measured for generating an object distance. The image is restored according to the acceleration signal and the object distance.

5 Claims, 2 Drawing Sheets

METHOD AND RELATED DEVICE FOR RESTORING IMAGE FOR ELECTRONIC DEVICE

RELATED APPLICATIONS

This application claims priority to Taiwan Application Serial Number 97124728, filed Jul. 1, 2008, which is herein incorporated by reference.

BACKGROUND OF THE INVENTION

1. Field of the Invention

The invention relates to a method for restoring an image for an electronic device and a related device and, more particularly, to a method for restoring an image and a related device for restoring an image of a photographed object according to an acceleration signal generated when the electronic device moves and the distance between the electronic device and the photographed object.

2. Description of the Prior Art

With the widespread usage of digital cameras, people require more and more to image quality. For example, the resolution of the image, the saturation of the color and other parameters become necessary considerations when a consumer chooses a digital camera product. More importantly, when the consumer takes photos using a handheld digital camera, the shake of hand may blur the image, and the definition of the image decreases. Therefore, an anti-shake function is necessary in a digital camera.

The conventional anti-shake technique may be divided into an optical anti-shake technique and an electronic anti-shake technique. The optical anti-shake technique is achieved by hardware, and the common method is setting a sensing device such as an accelerometer or a gyroscope in a lens module of the camera, or it may be combined with a charge coupled device (CCD) sensor inside the camera to detect the shake degree of the lens or the camera body when the hand shakes and transfer detected data to the processor in the camera body. The processor controls the lens in the lens module or the CCD sensor to move to compensate the displacement to obtain a stable image after a computing process. Although the optical anti-shake technique may amend the blurred image precisely, the price is high, and much space is occupied. In addition, hardware may be damaged when the electronic device is fallen off. Thus, the optical anti-shake technique cannot be applied to small electronic devices such as a camera phone or a lightweight digital camera.

In addition, the electronic anti-shake technique processes and restores the blurred image by software. The electronic anti-shake technique does not need additional hardware detecting devices, and thus it is always used in small electronic products. It is common to use high international standards organization (ISO) technique to control a shutter to finish photographing before the camera moves. Since the high ISO technique is weak in light-collection, signal intensity should be improved, and thus high noise is generated. Another common method is to estimate the moving path of the blurred image namely the point spread function (PSF) according to a special algorithm such as the Lucy-Richardson algorithm and restore the image according to the PSF. However, estimating the PSF of the high resolution image by the algorithm needs much computing time, and it is not practical.

SUMMARY OF THE INVENTION

The invention provides a method for restoring an image for an electronic device and a related device.

The invention discloses a method for restoring an image for an electronic device. The method for restoring the image includes the steps as follows. An acceleration signal is generated when an image of a photographed object is received. The distance between the electronic device and the photographed object is measured for generating an object distance. The image is restored according to the acceleration signal and the object distance.

The invention also discloses a device for restoring an image used in an electronic device. The device for restoring the image includes an accelerometer, a measuring unit and an image processing unit. The accelerometer is coupled to a camera module of the electronic device and used to generate an acceleration signal when the camera module receives an image of a photographed object. The measuring unit is coupled to the camera module for measuring the distance between the camera module and the photographed object to generate an object distance. The image processing unit is coupled to the camera module, the accelerometer and the measuring unit and used for processing the image according to the acceleration signal and the object distance to restore the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
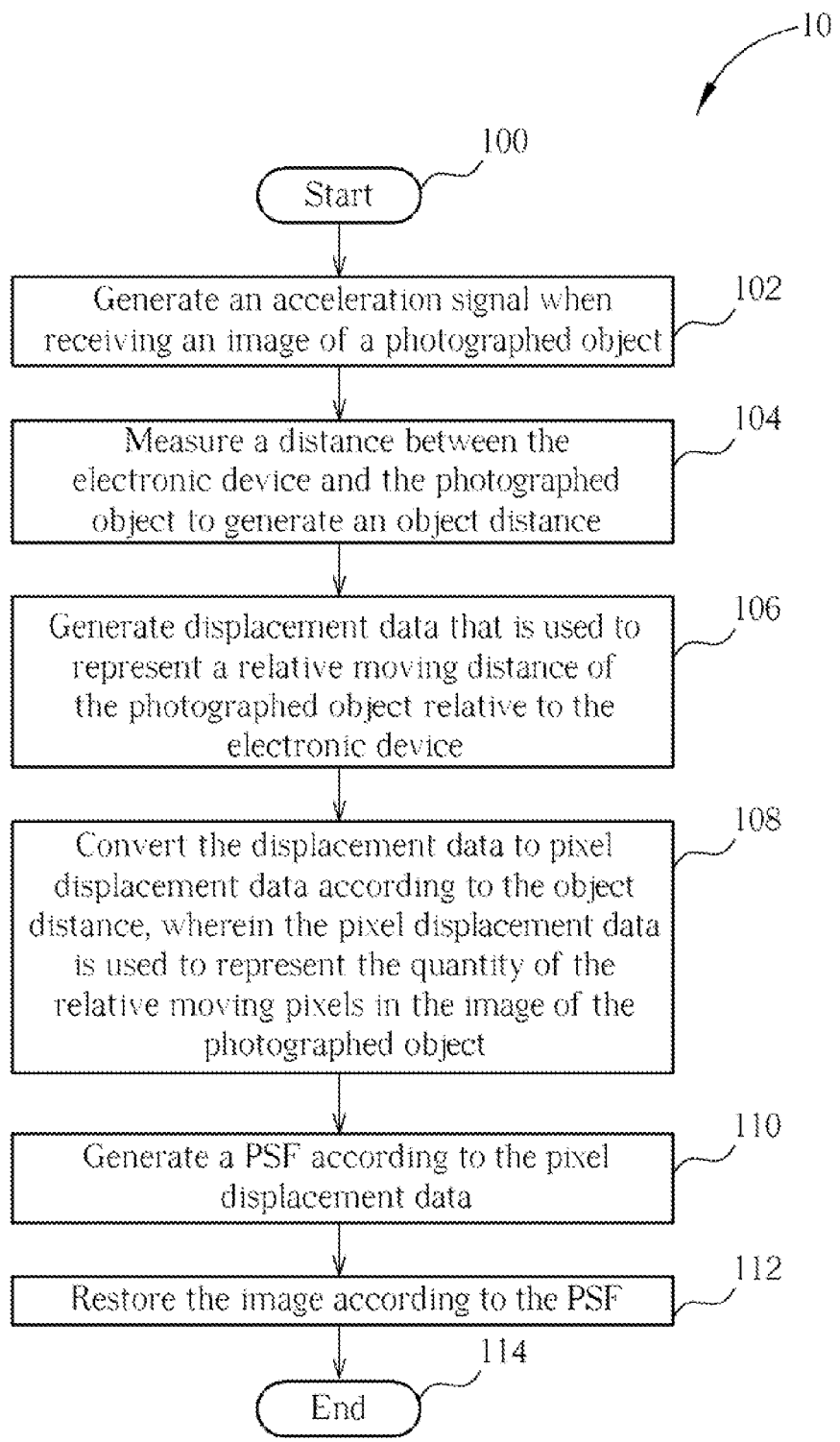
FIG. 1 is a schematic diagram showing a flow path in an embodiment of the invention.

FIG. 1 is a schematic diagram showing a flow path 10 in an embodiment of the invention. As shown in FIG. 1, the flow path 10 is adapted to an electronic device having a photographing function to restore blurred images taken by the electronic device. The flow path 10 includes steps as follows.

In step 100, the flow path is started.

In step 102, an acceleration signal is generated when an image of a photographed object is received.

In step 104, the distance between the electronic device and the photographed object is measured to generate an object distance.

In step 106, displacement data is generated according to the acceleration signal, and the displacement data is used to represent a relative moving distance of the photographed object relative to the electronic device.

In step 108, the displacement data is converted to pixel displacement data according to the object distance, and the pixel displacement data is used to represent the quantity of the relative moving pixels in the image of the photographed object.

In step 110, a PSF is generated according to the pixel displacement data.

In step 112, the image is restored according to the PSF.

In step 114, the flow path is finished.

The flow path 10 is illustrated in detail herein. The electronic device in the flow path 10 includes a camera module and an accelerometer, and it may be a mobile phone or a digital camera. First, the electronic device receives an image of a photographed object. An acceleration signal is generated while the image is received. The acceleration signal is generated when the electronic device is shaken. For example, the shake of the electronic device may be generated by the shake of a user's hand. In another aspect, the electronic device measures the distance between the electronic device itself (in fact, the inner camera module) and the photographed object to generate an object distance. Then, the electronic device generates displacement data according to the acceleration signal to represent the relative moving distance of the photographed object relative to the electronic device. In addition, the displacement data is converted to the pixel displacement data according to the object distance. The displacement data is used to represent the relative moving distance of the photographed object relative to the electronic device when the electronic device is shaken in photographing. The pixel displacement data is used to represent the quantity of the relative moving pixels in the image of the photographed object. For example, if the object distance is long, the photographed object is small in the image, and the quantity of the relative moving pixels is relatively less, and if the object distance is short, the photographed object is large in the image, and the quantity of the relative moving pixels is relatively greater. Furthermore, the electronic device may generate a PSF according to the pixel displacement data to represent the moving path of the photographed object in the blurred image. At last, the electronic device restores the image according to the PSF. The blurred image may be restored to a best identifying condition via the flow path 10. Thus, the user may identify the photographed object from the restored image.

If an optical anti-shake technique is used, large hardware space is occupied, and hardware is easy to be damaged when the electronic device is fallen off. The conventional electronic anti-shake technique such as the high ISO technique may bring more noise. The method of achieving the PSF by a special algorithm consumes much computing time. Compared with the above, in the invention, the acceleration signal and the object distance are computed to generate the PSF, and the blurred image is restored according to the PSF. Thus, the electronic device in the embodiment of the invention does not need to have an additional lens for amending the shake, and it also does not need to generate the PSF using the algorithm. This is adapted to the small electronic devices to restore the image quickly.

The acceleration signal and the object distance are computed to generate the PSF, and the blurred image is restored according to the PSF, which is the core technique of the invention. The flow path 10 is only an embodiment of the invention, and persons having ordinary skill in the art may make various modifications and changes. For example, the step 108 to step 114 of the flow path 10 may be simplified to be a step, and the step may be restoring the image according to the acceleration signal and the object distance. Methods of generating the PSF according to the acceleration signal and the object distance are within the scope of the invention.

Figure 2:
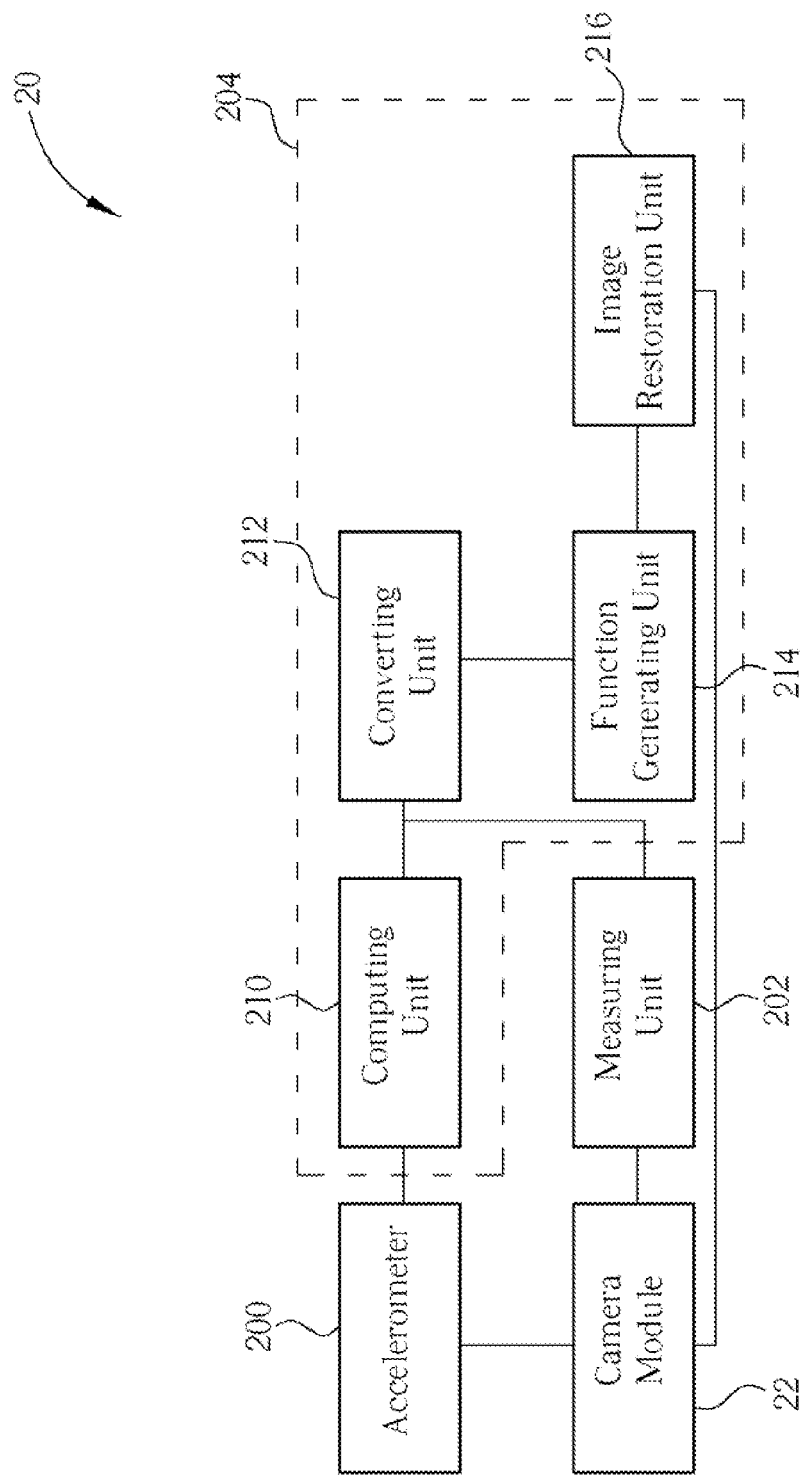
FIG. 2 is a schematic diagram showing a device for restoring an image in an embodiment of the invention.

FIG. 2 is a schematic diagram showing a device for restoring an image 20 in an embodiment of the invention. As shown in FIG. 2, the device for restoring the image 20 is used in an electronic device such as a mobile phone or a digital camera for restoring a blurred image. It includes an accelerometer 200, a measuring unit 202 and an image processing unit 204. The accelerometer 200 is coupled to a camera module 22 of the electronic device and used for generating an acceleration signal when the camera module 22 receives an image of a photographed object. For example, the accelerometer 200 is a 3-axis micro-electro-mechanical systems (MEMS) accelerometer. The measuring unit 202 is coupled to the camera module 22 for measuring the distance between the camera module 22 and the photographed object to generate an object distance. The image processing unit 204 is coupled to the camera module 22, the accelerometer 200 and the measuring unit 202 to process the image according to the acceleration signal and the object distance and to restore the image.

Furthermore, the image processing unit 204 includes a computing unit 210, a converting unit 212, a function generating unit 214 and an image restoration unit 216. The computing unit 210 is coupled to the accelerometer 200 and used for generating displacement data according to the acceleration signal. The displacement data is used to represent a relative moving distance of the photographed object relative to the camera module 22. The converting unit 212 is coupled to the measuring unit 202 and the computing unit 210 and used for converting the displacement data to pixel displacement data according to the object distance. The pixel displacement data is used to represent the quantity of the relative moving pixels in the image of the photographed object. The function generating unit 214 is coupled to the converting unit 212 and used for generating a PSF according to the pixel displacement data. The image restoration unit 216 is coupled to the function generating unit 214 and the camera module 22 to restore the blurred image according to the PSF. For example, the image restoration unit 216 is an image filter such as a wiener filter.

The function mode of the device for restoring the image 20 is shown in the flow path 10 in FIG. 1, and it is not illustrated herein for concise purpose. The image processing unit 204 of the device for restoring the image 20 is used to process the blurred image according to the acceleration signal and the object distance to restore the blurred image. The image processing unit 204 is an embodiment of the invention, and persons having ordinary skill in the art may make various modifications and changes. The image processing unit 204 includes a computing unit 210, a converting unit 212, a function generating unit 214 and an image restoration unit 216, but it is not limited thereto. The image processing unit 204 for restoring image by the PSF generated according to the acceleration signal and the object distance are within the scope of the invention.

To sum up, when the user uses the electronic device in the embodiment to take photos, the PSF is generated according to the acceleration signal generated by the accelerometer and the distance between the camera module of the electronic device and the photographed object, and the image is restored. Thus, the invention is adapted to electronic devices having small volume, and it may restore images efficiently and increase the resolving capability and the processing efficiency of the image.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

Those skilled in the art will readily observe that numerous modifications and alterations of the device and method may be made while retaining the teachings of the invention.

What is claimed is:

1. A method for restoring an image for an electronic device, comprising:

generating an acceleration signal when an image of a photographed object is received;

measuring the distance between the electronic device and the photographed object to generate an object distance; and restoring the image according to the acceleration signal and the object distance, further comprising:

generating displacement data according to the acceleration signal, wherein the displacement data is used to represent a relative moving distance of the photographed object relative to the electronic device;

converting the displacement data to pixel displacement data according to the object distance, wherein the pixel displacement data is used to represent the quantity of relative moving pixels in the image of the photographed object;

generating a point spread function (PSF) according to the pixel displacement data; and restoring the image according to the PSF.

2. A device for restoring an image used in an electronic device, comprising:

an accelerometer coupled to a camera module of the electronic device and used for generating an acceleration signal when the camera module receives an image of a photographed object;

a measuring unit coupled to the camera module and used for measuring the distance between the camera module and the photographed object to generate an object distance; and an image processing unit coupled to the camera module, the accelerometer and the measuring unit and used for processing the image according to the acceleration signal and the object distance and restoring the image, wherein the image processing unit further comprises:

a computing unit coupled to the accelerometer and used for generating displacement data according to the acceleration signal, wherein the displacement data is used to represent a relative moving distance of the photographed object relative to the camera module;

a converting unit coupled to the measuring unit and the computing unit and used for converting the displacement data to pixel displacement data according to the object distance, wherein the pixel displacement data is used to represent the quantity of the relative moving pixels in the image of the photographed object;

a function generating unit coupled to the converting unit and used for generating a PSF according to the pixel displacement data; and an image restoration unit coupled to the function generating unit and the camera module and used for restoring the image according to the PSF.

3. The device for restoring the image according to claim 2, wherein the image restoration unit is an image filter.

4. The device for restoring the image according to claim 3, wherein the image filter is a wiener filter.

5. The device for restoring the image according to claim 2, wherein the electronic device is a mobile phone or a digital camera.

\* \* \* \* \*